July 15, 1969 — L. M. KOELSCH — 3,455,235
SUGAR BEET COSSETTE PROCESSING
Filed Sept. 29, 1966 — 2 Sheets-Sheet 1
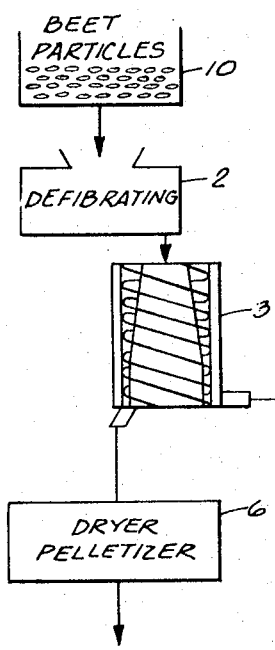
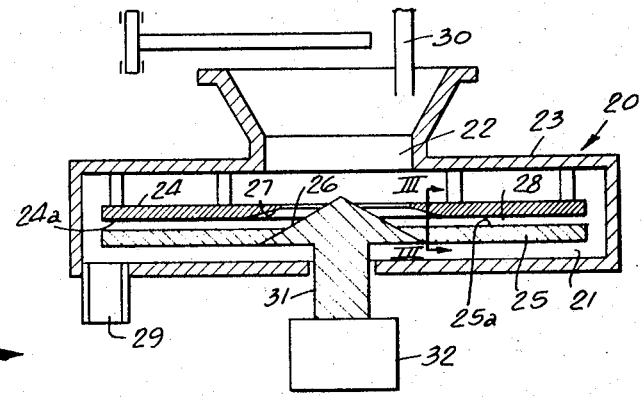
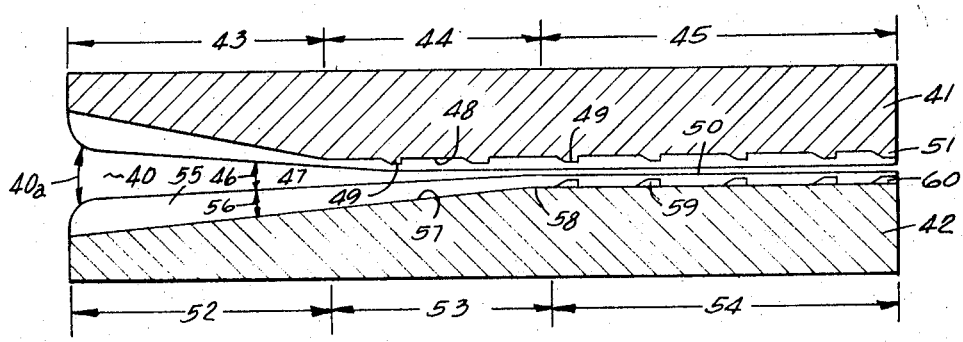
INVENTOR.
LESTER M. KOELSCH

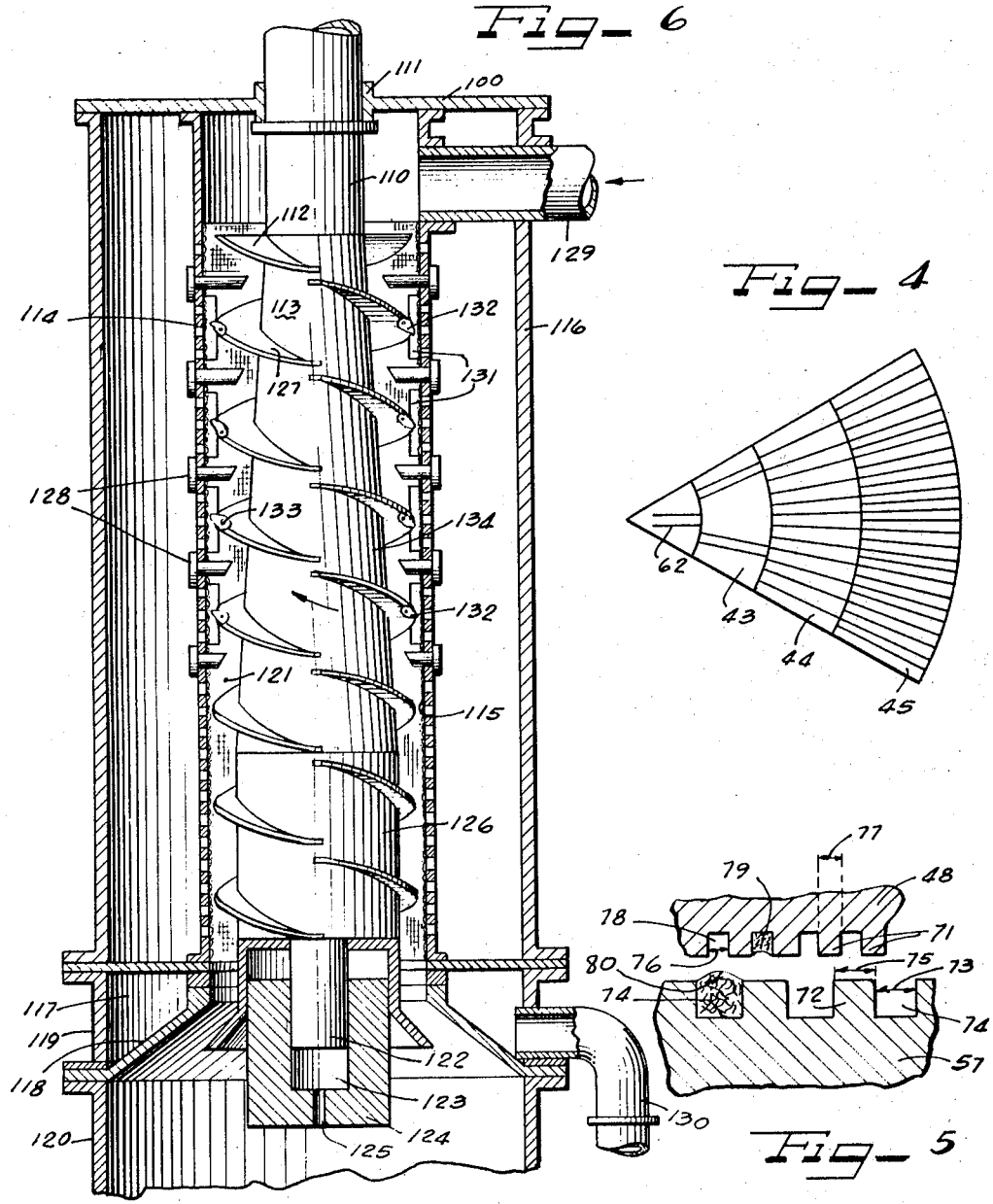

United States Patent Office 3,455,235
Patented July 15, 1969

3,455,235
SUGAR BEET COSSETTE PROCESSING
Lester M. Koelsch, Pittsfield, Mass., assignor to Beloit Corporation, Beloit, Wis., a corporation of Wisconsin
Filed Sept. 29, 1966, Ser. No. 582,957
Int. Cl. B30b 9/02, 13/00; B02c 7/08
U.S. Cl. 100—37      4 Claims

ABSTRACT OF THE DISCLOSURE

A method of treating spent sugar beet cossettes wherein the cossettes are reduced to substantially uniformly sized fiberlings, mechanically pressed to extract sugar water therefrom and dried and pelletized for other uses as desired.

---

This invention relates generally to sugar beets, and more specifically to a novel method of treating sugar beet cossettes from which sugar has been extracted in order to reduce them to pulp for cattle feed.

An object of the invention is the provision of an improved method and apparatus, adapted for continuous operation, wherein sugar beet cossettes are defibrated and liquid extracted from the fibers.

The production of sugar from sugar beets is a well established industry in this country and abroad. One of the major problems in this industry concerns the initial preparation of the sugar-containing liquid from the beets. The beets containing from 13 to 17 percent sugar (sucrose) and 0.8 percent ash, are uprooted from the fields with machines. Field workers follow the machines, remove the dirt and leaves from the beets, and load them for shipment to the factory. The beets enter the factory by way of flumes, small canals filled with warm water, which not only transport the beets but wash them as well. The prevalent practice for obtaining sugar-containing liquid is known as diffusion, and involves slicing the beets into long narrow strips called cossettes, then treating the cossettes in a batch or continuous diffuser with hot water. The beet cossettes, after they are removed from the diffuser contain considerable water, and are normally sent to a dryer where the moisture content is reduced and they are pelletized and sold as cattle feed. The spent cossettes must be sufficiently dried in order to be useful as a by-product which is costly in the amount of thermal energy needed for drying.

The present process involves fibrilating the beet cossettes into uniform beet fibers and subjecting the beet fibers to a screw press whereby a maximum amount of liquid is removed without the necessity of using heat. The pressed fibrilated beet material can then be dried to remove the remaining moisture by an internal rotary air dryer or some other such dryer, for example, but not limited thereto, such as disclosed by Robert A. Daane in copending application Ser. No. 413,263, filed Nov. 23, 1964, now Patent No. 3,363,665. This reduces the moisture content to approximately 5 to 15 percent and thereafter the material is properly pelletalized to be sold as cattle feed, plastics filler insulating board, furfural and other such like uses.

Further objects and advantages of the invention will become more apparent from the description herein and the annexed drawings in which:

FIGURE 1 is a diagrammatic showing of a preferred form of the process of the present invention;

FIGURE 2 is a diagrammatic showing of a preferred form of a defibering device used in the present invention;

FIGURE 3 is a partial sectional view taken substantially along the lines III—III of FIGURE 2 and showing the upper and lower defibering surface in their approximate operative relationship;

FIGURE 4 is a diagrammatic showing of a form of one of the attrition surfaces;

FIGURE 5 is a further diagrammatic showing of the working relationship of the attrited surfaces of FIGURES 3 and 4;

FIGURE 6 is an elevational view illustrating a form of a screw press used in the present invention.

As shown in FIGURE 1 the numeral 10 represents a bin for receiving beet cossettes, which are prepared by numerous known methods (not shown). The bin 10, has a suitable discharge mechanism (not shown) which permits the beet cossettes to pass downwardly to a conveyor or other suitable carrying means (not shown). The beet cossettes are thus continuously fed into a defibrating mechanism 2 wherein the beet cossettes are uniformly defibered to form beet fiberlets. Defibrilated beets may then be continuously fed, under pressure if desired, but without the addition of any liquid, to a first vertical screw press where the fibrilated beets are initially pressed to remove a substantial amount of the sugar-containing liquid. The first screw press removes approximately 50 to 90 percent of the liquid. The spent beet pulp, which is discharged at the bottom of the screw press may then be fed to a dryer. The dryer 6, which may be an internal rotary air drum, or one such as disclosed in copending application Ser. No. 413,263 mentioned previously and incorporated herein by reference capable of reducing the moisture content in the beet pulp to approximately 5 to 15 percent.

Various types of defibering devices may be used. It is contemplated for example that an impacting device such as a hammermill may be employed. As shown in detail in FIGURE 2, the preferred embodiment of a mechanical pulping and defibering device is similar to the device disclosed in the patent application of Alexander D. Cormack et al., Ser. No. 430,437, filed Feb. 4, 1965, incorporated herein by reference. It consists of a generally cylindrical housing 20 defining a pulping chamber 21 having a relatively large upwardly facing opening 22 for the introduction of the sugar beet cossettes. Within the pulping chamber 21 and supported from the upper wall 23 thereof is an upper defibrating disc or a stator 24 having a defibrating or attrition surface 24a thereon. Also within the pulping chamber 21 is a lower defibering disc or rotor 25 having a suitable attrition surface 25a thereon. Lower defibering disc 25 is mounted on shaft 31 which is connected to a suitable motor 32. The attrition surfaces 24a and 25a define therebetween a prebreaking zone 43, an initial defibering zone 44, and a final defibering zone 45 as indicated schematically in FIGURES 3 and 4 hereof. The central portion of the rotor 25 is conically shaped and extends upwardly through the upper stator 24 and defines a distributing zone 26 for uniformly distributing the beet cossettes throughout prebreaking zone 43. The distributing zone may consist of a generally conical shaped member having a plurality of radially extending distributing vanes 62 attached thereto, in FIGURE 3. The vanes 62 extend generally downwardly along the conical portion of the conical member so as to direct the beet cossettes toward the entrance portion of the prebreak zone 43. The distributing zone 26 thus supplies a uniform amount of material to each circumferential section of the entrance portion of the prebreak zone 26.

As the material leaves the prebreaking zone in a radially outwardly direction it enters into the first defibering zone 44 which consists of a plurality of generally parallel grooves and ridges mounted on opposed intermediate annular portions of the upper and lower stator and rotor respectively. The entrance portion 28 of the initial defibering zone 44 is in open communication with the material prebreaking zone 43 and thus continuously vented to ambient atmosphere. As fibrous beet cossettes leave the initial defibering zone 44 in a generally radially outwardly direction they are forced into a final defibering zone 45 defined by opposed outer annular portion of said upper and lower stator and rotor respectively. The final defibering zone consists of radially extending angularly spaced grooves and ridges mounted on said upper and lower angular portion of said stator and rotor respectively.

From the final defibering zone the fibrous beets are thrown radially outwardly into the pulping chamber 21 from which they are removed through an exit port 29, which is preferably tangential to the housing 20. Although only one exit port is shown, if desired, any number of such tangential exit ports may be provided around the periphery of the housing.

A dilution agent or other suitable carrying media, such as steam, for the fibrous beets may be supplied to the beet mass through the supply line 30 by which the consistency of the fibrous beets may be controlled and regulated.

In operation the sugar beet cossettes are supplied to the entrance portion 22 of the defibering device 2 of a temperature range of from 50° C. to 35° C. A suitable dilution agent may be added to the beet cossettes to obtain a mass having a consistency of about 1 percent to 100 percent and preferably 30 percent to 40 percent. The beet cossettes are then deposited in a continuously vented distributing zone 26 whereby the material is uniformly distributed throughout the continuously vented prebreaking zone 27. In prebreaking zone 27 the larger beet cossettes are reduced to fiber bundles having an approximate average bundle size of the beet mass and at this point the initial raise in temperature of the fibrous beets starts, due to the mechanical working action of the breaker bars in the prebreaking zone.

The breaker bars are generally trapezoidal in cross-sectional area which gradually decreases in a radially outward direction. Preferably the base dimension of the trapezoid is from .50 inch to 1.0 inch and the angle defined between the sides of the trapezoid and the vertical line may vary from 16° to 24° and is preferably in the neighborhood of 20°. The height of the trapezoid may vary from approximately .50 inch to 1.0 inch and is preferably .70 inch at the innermost extremity thereof and then gradually decreases to a height from between 0 inch to 1.0 inch and is preferably .7 inch. The preferred number of breaker bars on each disc may vary from 4 to 32 but lies preferably in the neighborhood of 16. A small number of breaker bars will result in insufficient prebreaking of the larger chunks of beets while too large a number of breaker bars will cause an unnecessary rise in temperature of the beets at too rapid a rate. The breaker bars of the lower disc 42 are substantially similar to the breaker bars of the upper disc as described above with the exception that the rate at which the cross-sectional area decreases is substantially smaller and the height may vary from a maximum dimension of .50 inch to 1.0 inch and preferably is .70 inch and gradually decreasing to a minimum height of from 0 inch to 1 inch and preferably .40 inch. The breaker bars of the upper disc 41 are stationary while the breaker bars of the lower disc 42 are rotatable with respect to the upper disc and therefore serve the local function of breaking up the larger beet fiber bundles and moving these beet fibers radially outwardly. From the prebreaking zone 27 the fibrous beets are continuously fed to continuously vented initial difibering zone 44 defined by opposed close running attrition surfaces 24a and 25a. In the initial defibering zone 44 the sugar beet fibers are subjected to mechanical rubbing and rolling action under control conditions of temperature and pressure. More specifically in the initial defibering zone the attrition surfaces impart a mechanical action to the fibrous beets thus rapidly raising the temperature of the mass. Due to the sudden rise in temperature of the mass a relatively large amount of steam is created which is permitted to rapidly escape through the open spaces between the beet cossettes in the prebreaking zone. The rapid escape of steam from the initial defibering zone avoids the creation of back pressure in said zone, thereby substantially increasing the uniformity of the beet cossettes fed into the defibering zone resulting in better uniformity of product.

As shown in FIGURE 3, which is the partial sectional view taken substantially along the lines III—III of FIGURE 2, the prebreak zone 27 consists of a gradually outwardly tapered mouth 40 defined by the upper and lower defiberating discs 41 and 42 respectively. The purpose of the taper is to gradually and evenly break the oversized chunks of beets and to cause them to be gradually thrown outwardly by centrifugal force. The entrance dimension 40a may vary from 0 inch to 4 inches. The spacing 46 between the bars at the exit portion of the prebreaking zone may vary from 0 inch to 2 inches and is preferably in the neighborhood of 1 inch. The lower disc 42 is vertically adjustable with respect to the upper disc and the above dimensions 40a and 46 are representative with the lower disc in a midway position. The material leaves the prebreaking zone 40 as a homogeneous mass of fiber bundles with virtually no large chunks of material, the beet fiber bundles enter into an intermediate material defibering zone 47. The zone 47 is defined by an intermediate annular portion 44 of the upper defibering disc and an intermediate annular portion 53 of the lower defibering disc. The opposed surfaces 48 and 57 of the upper and lower discs respectively are of a novel and special design so as to provide for adequate temperature control in order to avoid degradation of the cellulose fibers. It has been experimentally established that undesirable degradation of cellulose fibers occur in the presence of mechanical action if the temperature of the fiber mass is allowed to exceed about 180° C.

The intermediate defibering zone 47 allows the control of retention time of the fibrous beets in the intermediate zone due to special configuration of the annular chamber defined by the opposing surfaces 48 and 47. It will be noted that surface 57 gradually tapers away from surface 48 in a radially inward direction. More specifically, the surface 48 has a series of radially extending angularly spaced bars or ridges 71 thereon, best seen in FIG. 5. The ridges 71 define with the surface 48 a multiplicity of grooves which have been specifically designed to accomplish in addition to proper defibration and in cooperation with the lower disc surface 57, the functional temperature control and the control of retention time of the fibrous beets. The lower surface 57 is shown in detail in FIG. 5. It will be noted that the surface 57 has a multiplicity of bars 72 thereon thus providing a series of grooves and ridges which are of generally coarser configuration than the grooves and ridges of surface 48 of the upper disc 41. More specifically, the width 73 of the groove 74 is in the neighborhood of approximately ⅜ to ½ inch and the width 75 of the ridge 72 in the neighborhood of ⅜ to ½ inch as indicated in FIG. 5 which shows the coarse intermediate zone of the lower disc 57. The intermediate defibering section of the upper stationary disc 48 is of substantially finer design and more specifically, the width 76 of the groove 78 is preferably in the neighborhood of .125 to .250 inch, while the width 77 of the ridge 71 is preferably in the neighborhood of .095 to 0.20 inch.

From the intermediate zone 47, the partially defibered beets travel into a final defibering zone 50. As shown in FIG. 3, the final defibering zone 50 is defined by an outer annular portion 45 of the upper defibering disc 41 and the outer annular portion 54 of the lower defibering disc 42. In the final defibering zone the temperature of the fibrous beets is maintained at approximately 140° C. The opposed surfaces 51 and 60 of the upper and lower disc respectively, are provided with a multiplicity of grooves and ridges of a special design which afford final defibration of the fibrous beets in such a manner that it is acceptable for the maximum expression of a sugar-containing liquid while retaining the proper beet fiber size for further use in plasterboard and other like material. The dimensions of the grooves and ridges of the upper defibering plate in the final defibering zone 45 are substantially equal to the dimensions of the grooves and ridges in the intermediate zone 44. It should, however, be noted in the final zone the ridges are of substantial constant heights or nearly so as are the ridges of the outer annular portion 54 of the lower plate 42. Depending upon the actual consistency of the fibrous beets the final defibering zone may be somewhat tapered toward the outer periphery thereof. Generally speaking the higher the consistency of the fibrous beets the lesser the taper will be. Such a taper may be machined or cast into the upper plate section 41 as well as into the lower plate section 42 or, alternatively, either one may be tapered while the other remains flat. Dams 49 and 59 are provided in the upper and lower plate section, in the grooves thereof to retain the fibrous beets therein.

As above stated it is to be understood that other types of defibering devices may be employed in the defibering step of the process.

After the beet cossettes have been sufficiently defibered, they are passed through exit port 29 into the screw press. If desired, a pumping station (not shown) may be placed between the exit portion of the defibering mechanism and the entrance portion of the screw press, which will provide from about 5 to 10 p.s.i. pressure to the press, thus allowing better control of the amount of pressure and time that the fibrilated beets are subjected to.

Various types of presses may be used but a preferred type is shown in FIG. 6, wherein the pulp press is similar to the construction disclosed in my U.S. Letters Patent 3,126,818 (which patent is hereby incorporated by reference), and comprises a frame plate 100 mounted on a conventional support structure such as I-beam or the like, suitably disposed in concentric spaced relationship about the plate which includes a bearing collar 111 having journalled therein the upper or neck portion 110 of a conical tapered extrusion spindle 113 generally disposed with a perforated cylindrical shell 114 suitably mounted at its upper end to the frame plate in depending relation therefrom. As will be understood, in accordance with the conventional practices, the shell is perforated to facilitate the passage of expressed sugar-containing liquid therethrough during extrusion of beet fibers in the press on passage therethrough. The shell may form a screen for retaining the beet fibers during extraction and expression of sugar-containing liquid from the beet fibers, or the shell may form a backing or perforated structural support for the mounting on its wall surface of a secondary screen 115 of desired mesh.

Surrounding the perforated shell 114 and depending in suitable securement from frameplate 100 is a cylindrical imperforated housing or casting 116 in coextension with the shell. Secured to the lower portion of the shell 114 and the housing 116 is a trough 117 defined by a conical annular wallplate 118 and a cylindrical wall portion 119 suitably secured together and to the shell 114 and the housing 116. Dependent from the trough 117 is a suitable skirt 120 for confining the discharge end of the press.

Rotatably mounted in spaced relationship with the shells 114 is a spindle 113, forming therebetween an extrusion chamber 121. The spindle 113 is supported in shell 114 by means of depending extension 122 rotatably journalled in the hydraulic chamber 123 of a hydraulic support 124, adapting the spindle for vertical adjustment and controlled movement by means of a desired variation of and control of pressure delivered to a hydraulic chamber 123 through an inlet 125. As may be seen from this illustration, the spindle is of conical or tapered configuration having its divergent end 126 disposed adjacent the discharge end of the press, thus forming a progressively conical area in the extrusion chamber toward the discharge under the press. Fixedly mounted along the spindle 113 is an interrupted, or, if desired, continuous, helical or spiral flight arrangement 127 having in the embodiment illustrated interrupted threads or screw elements extending radially into close proximity with the inner wall of shell 114. The provision of the flight arrangement 127 adapts the spindle for effecting movement of stock in the extrusion chamber to a discharge end 126 of the press on rotation of the spindle actuated by conventional motor means, not shown, suitably connected or geared to the neck portion 110 of the spindle. To resist the rotation of the stock in the extrusion chamber the shell is provided with a plurality of projections or bars 128 which have downwardly angular surfaces and project internally therefrom into the extrusion chamber 121 intermediate the interrupted helical flight 127.

Accordingly, on rotation of the spindle, the threads of the flight arrangement 127 engage the beet fibers fed into the extrusion chamber 121 and force the beet fibers downward toward the discharge end of the press through progressively constructed annular area defined between the spindle 113 and shell 114. Discharge of the material from the press is controlled by means of a choke cone mounted on the lower portion of spindle 113 in cooperating relationship with conical wall 118 of trough 117. The feed or flow of the beet fibers into the extrusion chamber is accomplished by means of an inlet conduit 129 extending into the extrusion chamber through housing 116 and shell 114, with the removal of the sugar-containing liquid passing through the shell and collecting in the trough 117 effected by means of a discharge line 130 connected into the trough. If desired, a pumping station may be placed in connection with inlet conduit 129 so as to maintain the screw press under positive pressure. It has been found that a pressure of between 2 to 15 p.s.i. and preferably between 5 to 10 p.s.i. will allow the maximum amount of sugar-containing liquid to be expressed from the beet fibers in the shortest amount of time.

The wet beet fibers being compressed are prevented from rotating with the spindle by resistor bars 128. Without the resistor bars the coefficient of friction of the beet fibers would not be adequate to prevent them from sliding on the shell surface. The resistor bars have an angular surface that tends to move the material down as they resist the rotational force. As illustrated in FIG. 6, the helical flight of the spindle is interrupted and overlap in order to allow the resistor bars to extend from the shell surface, close to the spindle body.

To eliminate and prevent binding of the shell due to lodging and accumulation of solid beet fiber thereon, a plurality of screened wiper blades 131 are mounted in helical spaced relationship to each other along the threads or flight elements 127 adjacent the periphery thereof. Each of the wiper blades is of elongated configuration for longitudinal extension along the inner wall of the shell. The wiper blades are adapted for swinging movement on the thread or flight element by means of a bifurcated projection forming lugs 132 for receiving the flight elements therebetween to which the wiper blade is pivotally mounted by means of a pin 133 extending through the lug holes in a suitable mounting hole provided in the flight element. Since the wiper blade is freely pivotable, it is thus adapted for swinging movement against the shell 114. Preferably to provide for optimum clearance between the spindle assembly and the shell the flight element may be suitably notched to accommodate retraction of the wiper blades therein. The wiper blade is actuated by the beet fibers which force the blade against the shell, thereby cleaning the shell of solid beet fibers and preventing accumulation of the fiber thereon by removing and shearing the particles lodged or deposited on the shell.

Also, as illustrated in FIG. 6, the screw press is adapted for increased extraction of liquid from the stock by forming the spindle with an upper portion 134 and a lower portion 126. The upper portion is provided with a tapered conical configuration having the convergent end thereof disposed adjacent the inlet of the press with its peripheral surface longitudinally defining a downwardly converging angle with the inner wall of the shell. The lower portion 126 is provided with configuration having a peripheral surface extending longitudinally parallel with the shell to form a uniform angular extrusion chamber of substantial length. This parallel relationship between the shell and the lower spindle portion prevents further radial compression of the extruded stock to maintain the material in an optimum thickness to keep the radial drain channels therein open for continuing flow of expressed fluid therethrough.

As above stated other types of presses may be employed in the dewatering step of the process. The defibering step places the cossettes in a condition wherein the water can satisfactorily be expressed mechanically and more expensive thermal drying is not necessary. Following the dewatering of the fibers they are suitably pressed into pellets by equipment 7 otherwise handled for storage and use.

Although the invention has been described with reference to specific materials, embodiments and details, the various modifications and changes within the scope of this invention will be apparent to one skilled in the art and are contemplated to be embraced within the invention.

I claim as my invention:

1. A method of treating sugar beet cossettes which comprises:
   (1) introducing the beet cossettes into a continuously vented distributing zone whereby the beet cossettes are uniformly distributed throughout a continuously vented prebreaking zone, continuously feeding the prebroken beet cossettes to a continuously vented initial defibering zone defined by opposed close running attrition surfaces whereby the prebroken beet cossettes are subjected to mechanical rubbing and rolling action under controlled conditions of temperature and pressure, continuously feeding the initially defibered beet cossettes to a final defibering zone defined by the outer portions of said close running attrition surfaces and spaced radially outwardly therefrom whereby the individual undeveloped fibers are subject to abrasive action to fibrilate and soften the prebroken beet cossettes; and
   (2) continuously feeding the fibrilated beet cossettes to a screw press and extracting the liquid therefrom.

2. A method of treating sugar beet cossettes in accordance with claim 1 which includes subsequently pelletizing the material from the press.

3. A mechanism for dewatering sugar beet cossettes comprising first means for substantially uniformly defibering the beet cossettes and second means receiving the defibered cossettes and mechanically pressing the liquid therefrom wherein said first means includes a pair of relatively rotating plates having a defibering means on the surface thereof, and said second means includes an annular enclosure with radial perforations therein and an auger within the perforations having advancing flights on the auger with an auger core supporting the flights and said core increasing in diameter with the depths of the flights decreasing from a receiving end to a discharge end.

4. A mechanism for treating sugar beet cossettes in accordance with claim 3 in which said first means includes (1) a continuously vented distributing zone whereby the beet cossettes are uniformly distributed between relatively close running attrition surfaces, said attrition surfaces having a continuously vented prebreaking zone and including a final defibering zone defined by the outer portions of said close running attrition surfaces and spaced radially outwardly therefrom whereby the individual undeveloped beet fibers are subjected to abrasive actions to fibrilate and soften the prebroken beet cossettes; and (2) said second means includes a screw press comprising a perforated cylindrical shell having an inlet adjacent one end thereof and a discharge end adjacent the opposite end thereof, a spindle coaxially mounted in spaced relationship with said shell and comprising a first spindle portion and a second spindle portion, said first spindle portion being of tapered conical configuration having the converging end thereof disposed adjacent the inlet of said press with the peripheral surface of said first spindle portion longitudinally defining an angle with the inner wall of said shell, said second spindle portion forming a continuation of said first spindle portion from the diverging end thereof and having a peripheral surface extending longitudinally parallel with said inner wall of said shell toward the discharge end of said press, a helical flight arrangement fixedly mounted along said first and second portions of said spindle with the threads of said flight arrangement extending radially into close proximity with said inner wall of said shell, said helical flights being composed of a plurality of interrupted spiral flights arranged to balance one another, a plurality of resistor bars having downwardly angular surfaces mounted inwardly from said cylindrical shell and having interior passages therein for the conductance of heating fluid to the fibrilated beets, motor means for imparting rotary movement to said spindle relative to said shell to move the fibrilated beets toward a discharge end of said press, and liquid gathering means disposed externally of said shell for collecting liquid passing through said shell externally therethrough.

References Cited

UNITED STATES PATENTS

| 962,725 | 6/1910 | Stewart | 127—4 |
|---|---|---|---|
| 1,871,833 | 8/1932 | Anderson | 100—94 |
| 2,937,815 | 5/1960 | Eirich et al. | 241—257 |
| 2,970,776 | 2/1961 | Buckman | 100—96 X |
| 3,002,446 | 10/1961 | Jung | 100—145 |
| 3,126,818 | 3/1964 | Koelsch | 100—150 X |
| 3,188,942 | 6/1965 | Wandel | 100—96 X |
| 3,191,872 | 6/1965 | Dyson | 241—74 |
| 3,195,446 | 7/1965 | French | 100—37 |
| 3,313,653 | 4/1967 | Jung | 124—4 |
| 3,319,897 | 5/1967 | Craig et al. | 241—46 |

FOREIGN PATENTS

| 166,954 | 10/1950 | Austria. |
|---|---|---|
| 335,649 | 4/1921 | Germany. |
| 268,450 | 10/1929 | Italy. |

PETER FELDMAN, Primary Examiner

U.S. Cl. X.R.

100—39, 96, 145, 150; 241—257